(12) United States Patent
Nitta

(10) Patent No.: US 9,760,461 B2
(45) Date of Patent: Sep. 12, 2017

(54) ELECTRONIC DEVICE AND FIRMWARE RECOVERY PROGRAM THAT ENSURE RECOVERY OF FIRMWARE

(71) Applicant: Kyocera Document Solutions Inc., Osaka (JP)

(72) Inventor: Kenichiro Nitta, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 10 days.

(21) Appl. No.: 14/979,540

(22) Filed: Dec. 28, 2015

(65) Prior Publication Data

US 2016/0188430 A1 Jun. 30, 2016

(30) Foreign Application Priority Data

Dec. 26, 2014 (JP) ................. 2014-265435

(51) Int. Cl.
| | | |
|---|---|---|
| G06F 11/00 | (2006.01) | |
| G06F 11/20 | (2006.01) | |
| G06F 11/22 | (2006.01) | |
| G06F 9/44 | (2006.01) | |
| G06F 11/14 | (2006.01) | |
| G06F 9/445 | (2006.01) | |
| G06F 11/16 | (2006.01) | |

(52) U.S. Cl.
CPC ............ *G06F 11/2094* (2013.01); *G06F 8/65* (2013.01); *G06F 9/4401* (2013.01); *G06F 9/4406* (2013.01); *G06F 11/1417* (2013.01); *G06F 11/1662* (2013.01); *G06F 11/2284* (2013.01)

(58) Field of Classification Search
CPC ............ G06F 11/2094; G06F 11/1417; G06F 11/1662; G06F 11/1402; G06F 11/1469; G06F 11/2284; G06F 8/65; G06F 9/4401; G06F 9/4406
USPC ........................ 714/36, 6.1, 6.3, 6.31, 42, 54
See application file for complete search history.

(56) References Cited

U.S. PATENT DOCUMENTS

| | | | | |
|---|---|---|---|---|
| 8,386,842 B2 * | 2/2013 | Lin | ................... | G06F 11/1417 714/2 |
| 2002/0147941 A1 * | 10/2002 | Gentile | ............... | G06F 11/1417 714/36 |

(Continued)

FOREIGN PATENT DOCUMENTS

| | | |
|---|---|---|
| JP | 2003-122575 A | 4/2003 |
| JP | 2012-174061 A | 9/2012 |
| JP | 2013-182316 A | 9/2013 |

*Primary Examiner* — Joseph D Manoskey
(74) *Attorney, Agent, or Firm* — James Judge

(57) ABSTRACT

An electronic device includes a first nonvolatile memory, a second nonvolatile memory, and a control circuit. The first nonvolatile memory includes an area to store firmware. The firmware includes a first kernel. The second nonvolatile memory includes an area to store an update program, the update program including a second kernel. The control circuit boots the one of the first and the second kernels, and ensures writing data to the first nonvolatile memory by the booted one of the first and the second kernels. When the firmware is incapable of being read, the control circuit reads the update program and performs the boot process to boot the second kernel, and writes updating data of the firmware to the first nonvolatile memory, the first nonvolatile memory being writable of the data by the booted second kernel.

6 Claims, 12 Drawing Sheets

(56) References Cited

U.S. PATENT DOCUMENTS

2012/0011393 A1* 1/2012 Roberts .............. G06F 11/1417
714/6.3
2014/0223160 A1 8/2014 Kim

* cited by examiner

ELECTRONIC DEVICE AND FIRMWARE RECOVERY PROGRAM THAT ENSURE RECOVERY OF FIRMWARE

INCORPORATION BY REFERENCE

This application is based upon, and claims the benefit of priority from, corresponding Japanese Patent Application No. 2014-265435 filed in the Japan Patent Office on Dec. 26, 2014, the entire contents of which are incorporated herein by reference.

BACKGROUND

Unless otherwise indicated herein, the description in this section is not prior art to the claims in this application and is not admitted to be prior art by inclusion in this section.

There have been requests for reducing activation time of an electronic device, which includes an information processing device such as a personal computer and an image forming apparatus such as a digital multi-functional peripheral, for reducing stress to a user, or any other reason.

A read of firmware from a read only memory (ROM) or any other operation is performed during activation of the electronic device. Therefore, an increase in speed of reading firmware is expected to contribute to a reduction in the activation time.

The speed of reading firmware can be increased in a relatively simple manner in terms of hardware. In other words, while firmware is generally stored in a non-volatile flash memory, storing in a solid state drive (SSD) instead of the flash memory can increase the speed of reading. The SSD ensures the increased speed of reading by simultaneous access to a plurality of flash memories.

Meanwhile, the SSD causes a problem that a file system is subject to be damaged due to power shutdown with the electronic device in operation, or any other incident.

Thus, the firmware cannot be read due to the damage of the file system on the SSD when storing the firmware in the SSD. Accordingly, activation of the electronic device may not be able to be performed.

When replacing an SSD, an unused SSD before storing firmware is mounted on the electronic device. Accordingly, due to the absence of the firmware in the SSD, the activation of the electronic device cannot be performed similarly to the case of the damaged file system.

In response to this situation, for example, a technique to store a master program and a backup program of the firmware in advance, activate the electronic device with one of the master program and the backup program, and recover the other damaged has been proposed.

SUMMARY

An electronic device according to an aspect of the disclosure includes a first nonvolatile memory, a second nonvolatile memory, and a control circuit. The first nonvolatile memory includes an area to store firmware. The firmware includes a first kernel. The second nonvolatile memory includes an area to store an update program, the update program including a second kernel. The control circuit reads one of the firmware and the update program by boot process, boots the one of the first and the second kernels, and ensures writing data to the first nonvolatile memory by the booted one of the first and the second kernels. When the firmware is incapable of being read, the control circuit reads the update program and performs the boot process to boot the second kernel, and writes updating data of the firmware to the first nonvolatile memory, the first nonvolatile memory being writable of the data by the booted second kernel.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
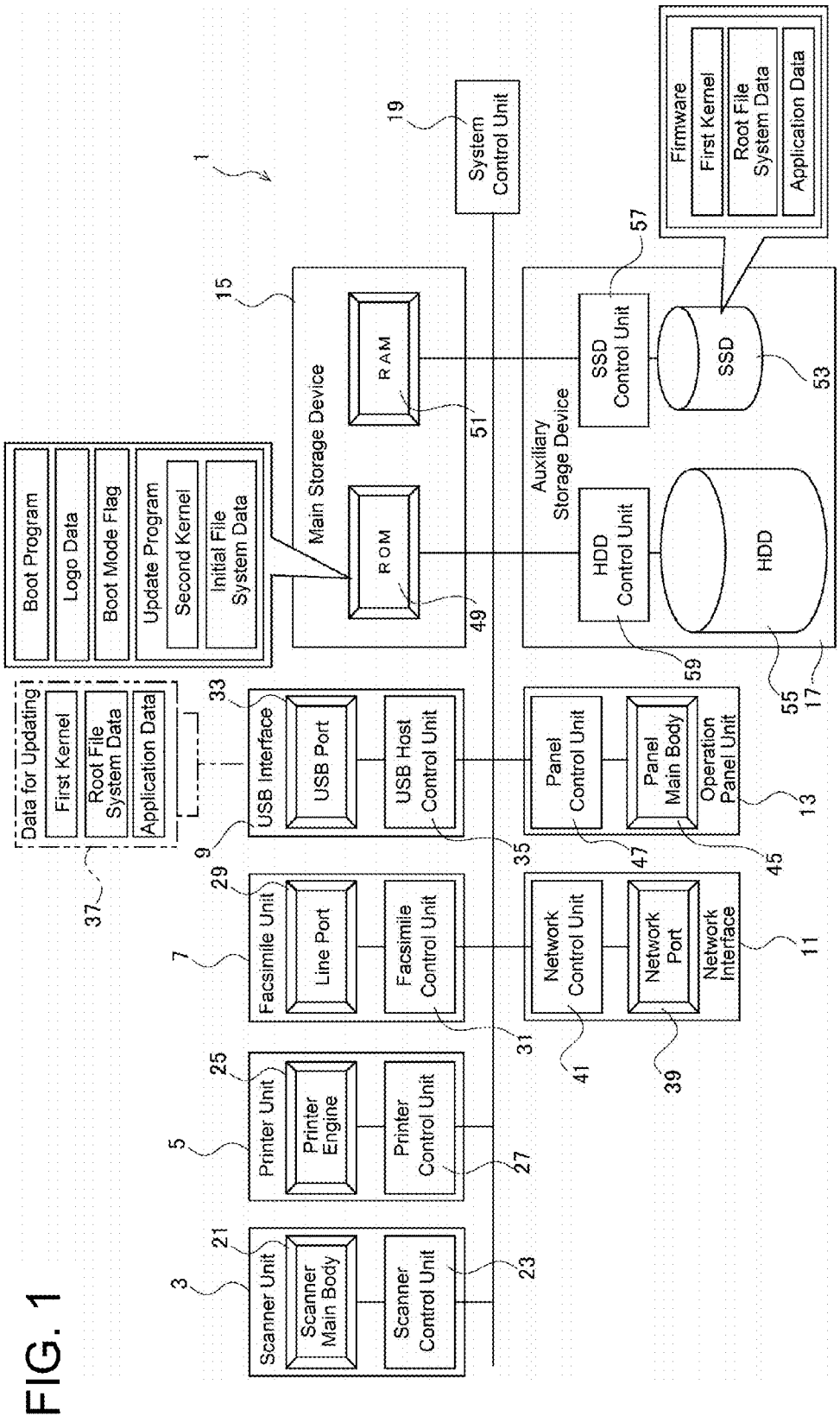
FIG. 1 illustrates a configuration of an electronic device according to Embodiment 1 of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

An object that ensures recovery of firmware even when the firmware cannot be read during activation of an electronic device is achieved by reading an update program including a second kernel stored in a second nonvolatile memory to boot the second kernel when the firmware including a first kernel stored in a first nonvolatile memory cannot be read.

Embodiment 1: Configuration of Electronic Device

FIG. 1 illustrates a schematic configuration of the electronic device according to Embodiment 1 of the disclosure.

An electronic device 1, which is an image forming apparatus such as a digital multi-functional peripheral or a similar device, has various kinds of functions such as a copy function, a print function, a facsimile function or a similar function. The electronic device 1 may employ any device other than the image forming apparatus, which is capable of reading firmware during activation in a manner such as a personal computer, another information processing device, or a similar device.

The electronic device 1 of Embodiment 1 includes a scanner unit 3, a printer unit 5, a facsimile unit 7, a USB interface 9 functioning as an external interface, a network interface 11, an operation panel unit 13, a main storage device 15, an auxiliary storage device 17, and a system control unit 19. The system control unit 19 is also simply referred to as a control circuit.

The scanner unit 3, which includes a scanner main body 21 and a scanner control unit 23, performs processing to scan a document image with the scanner main body 21 by control of the scanner control unit 23 to form image data.

The printer unit 5, which includes a printer engine 25 and a printer control unit 27, performs processing to form an image on a paper sheet based on the image data with the printer engine 25 by control of the printer control unit 27.

The facsimile unit 7, which includes a line port 29 and a facsimile control unit 31, performs processing to transmit and receive a facsimile via the line port 29 via a telephone line by control of the facsimile control unit 31.

The USB interface 9, which includes a USB port 33 and a USB host control unit 35, can perform processing to transmit and receive data to/from a USB flash drive 37 functioning as an external storage medium connected to the USB port 33 by control of the USB host control unit 35.

The network interface 11, which includes a network port 39 and a network control unit 41, can perform processing to transmit and receive the data to/from an external device via the network port 39 via a network such as the Internet by control of the network control unit 41.

The operation panel unit 13, which includes a panel main body 45 including a touch panel type screen or any other display and a panel control unit 47, accepts operation inputs to the electronic device 1 and displays operation states of the electronic device 1 on the panel main body 45 by control of the panel control unit 47.

The main storage device 15 includes a read only memory (ROM) 49, a random access memory (RAM) 51, or a similar memory.

The ROM 49 includes an area to store the update program of the firmware as the second nonvolatile memory of Embodiment 1, and is composed of such as a flash memory as a non-volatile semiconductor memory. The ROM 49 stores a boot program required for activation of the electronic device 1, logo data, and a boot mode flag in addition to the update program. The detail of the update program, the boot program, and the boot mode flag will be described below.

The RAM 51, which is a volatile memory including a volatile semiconductor memory or a similar memory, functions as a work area.

The auxiliary storage device 17 includes a solid state drive (SSD) 53, a hard disk drive (HDD) 55, or any other device.

The SSD 53, which includes an area to store the firmware as the first nonvolatile memory of Embodiment 1, is constituted of a plurality of non-volatile flash memories capable of being accessed simultaneously. The simultaneous access makes the speed of reading data in the SSD 53 faster than that of in the ROM 49 as a flash memory. The SSD 53 incorporates an SSD control unit 57 to control reading and writing of data. The detail of the firmware will be described below.

The HDD 55 is a non-volatile memory incorporating a plurality of hard disk drives. An HDD control unit 59 incorporated by the HDD 55 controls the reading and writing of data.

The scanner control unit 23, the printer control unit 27, the facsimile control unit 31, the USB host control unit 35, the network control unit 41, the panel control unit 47, the SSD control unit 57, and the HDD control unit 59 can be constituted of an arithmetic processing unit.

The system control unit 19 controls an overall system including the above-described respective units. The system control unit 19, the scanner control unit 23, the printer control unit 27, the facsimile control unit 31, the USB host control unit 35, the network control unit 41, the panel control unit 47, the SSD control unit 57, and the HDD control unit 59 are arithmetic processing units such as a central processing unit (CPU). The arithmetic processing unit, which is a processor having one or more circuits, can load the various programs to execute and also can execute the various programs incorporated inside in advance. Here, the circuit may be an electronic component or an electronic substrate to which a plurality of electronic elements are connected through the wiring.

The system control unit 19 reads the firmware from the SSD 53 to perform activation processing of the electronic device 1 during activation of the electronic device 1. The system control unit 19 of Embodiment 1 reads the update program from the ROM 49 to perform recovery processing or update processing of the firmware, when the firmware cannot be read from the SSD 53 or when an update of the firmware is requested. The recovery processing and the update processing perform updating the firmware with the update program and get a different updated result from one another. That is, the recovery processing of the firmware recovers damaged firmware corresponding to the updated result of the firmware. The update processing updates the existing firmware corresponding to the updated result of the firmware.

System Control Unit

Figure 2:
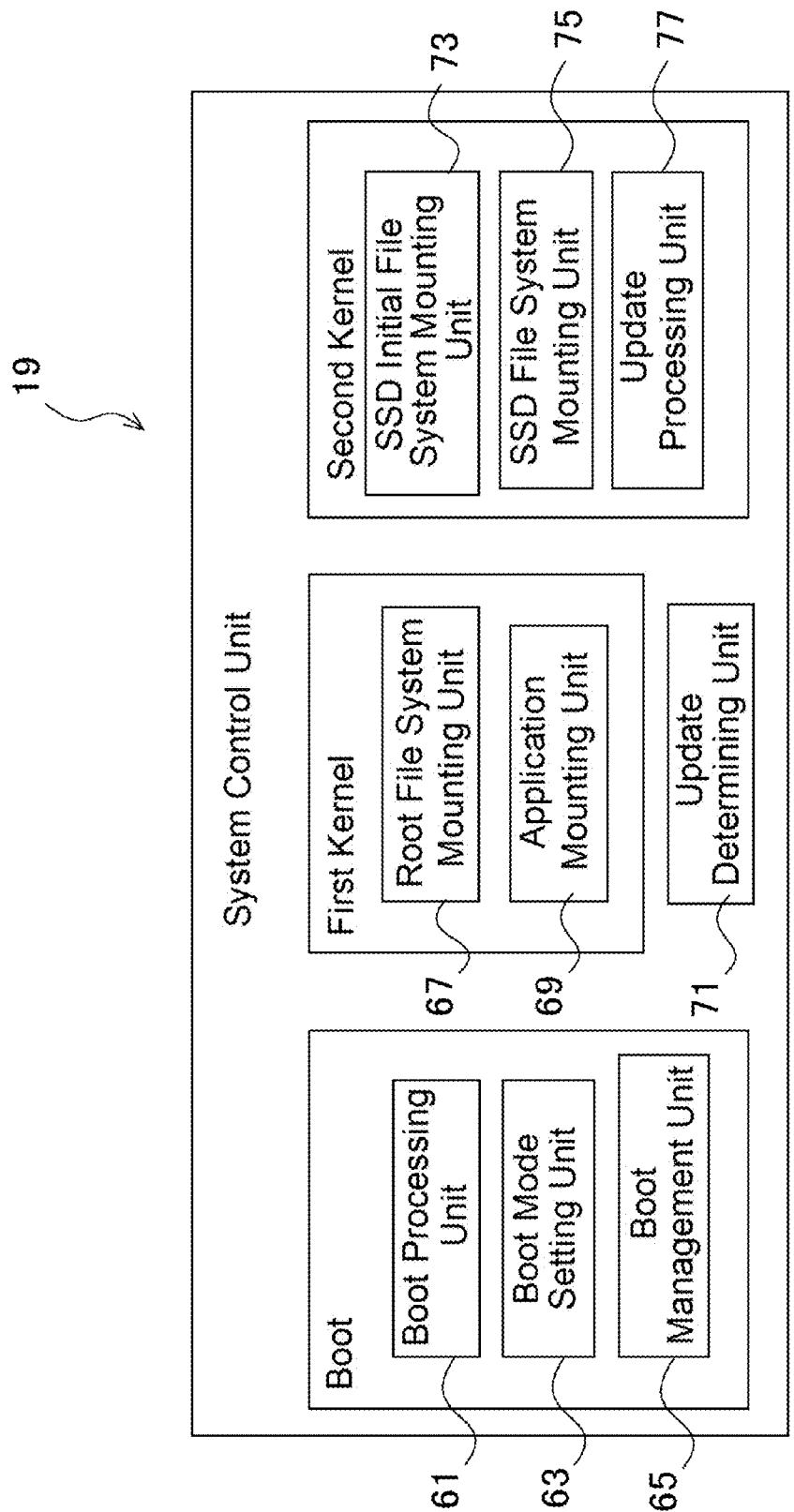
FIG. 2 illustrates a detail of a system control unit of the electronic device according to Embodiment 1.

FIG. 2 illustrates a detail of the system control unit 19 in the electronic device 1 of FIG. 1.

The system control unit 19 starts a boot by executing the boot program in the ROM 49 immediately after activation of the electronic device 1. The started boot causes the system control unit 19 to function as a boot processing unit 61, a boot mode setting unit 63, and a boot management unit 65.

The boot processing unit 61, which implements a function of boot process, performs the boot process that boots a kernel. In Embodiment 1, the first kernel included in the firmware or the second kernel included in the update program is booted.

When booting the first kernel, the boot processing unit 61 reads the firmware from the SSD 53 to load the firmware into the RAM 51 so as to boot the first kernel included in the loaded firmware.

When booting the second kernel, the boot processing unit 61 reads the update program from the ROM 49 to load the update program into the RAM 51 so as to boot the second kernel included in the update program.

The firmware in the SSD 53 contains root file system data and application data, in addition to the first kernel. The update program in the ROM 49 contains initial file system data of the SSD 53, in addition to the second kernel.

The boot processing unit 61 initializes peripherals, after starting boot and before booting kernel. After initialization of the peripherals, the boot processing unit 61 reads the logo data from the ROM 49 to load the logo data into the RAM 51 so as to display a logo on the operation panel unit 13.

The boot mode setting unit 63, which implements a function of a boot mode setting, sets whether the boot process is in any of a normal mode, an update mode, and a recovery mode based on the boot mode flag in the ROM 49.

The boot mode setting unit 63 sets the mode of the boot mode flag to the normal mode when rebooting the electronic device 1. When an update is requested, the boot mode setting unit 63 sets the mode of the boot mode flag to the update mode when rebooting the electronic device 1, as described below. The boot mode setting unit 63 sets the mode of the boot mode flag to the recovery mode when the boot processing unit 61 cannot read the firmware from the SSD 53.

The case in which the firmware cannot be read from the SSD 53 mainly includes the cases of in which the file system on the SSD 53 is damaged and in which the firmware is not stored in the SSD 53 due to replacement or a similar event of the SSD 53.

The boot management unit 65, which implements a function of boot management, causes the boot processing unit 61 to read the update program from the ROM 49 to boot the second kernel when the boot processing unit 61 cannot read the firmware from the SSD 53, that is, when the boot mode flag is set to the recovery mode.

The boot management unit 65 of Embodiment 1 causes the boot processing unit 61 to boot the second kernel even when the boot mode flag is set to the update mode.

The boot management unit 65 causes the boot processing unit 61 to boot the first kernel when the boot mode flag is set to the normal mode.

When the first kernel boots, the booted first kernel causes the system control unit 19 to function as a root file system mounting unit 67 and an application mounting unit 69.

The root file system mounting unit 67, which implements a function of root file system mounting, mounts a root file system with root file system data included in the firmware loaded into the RAM 51. The root file system has a directory tree in a tree structure with a root directory at the top, and enables the data to be read from and written to the SSD 53 and the HDD 55.

Therefore, the system control unit 19 of Embodiment 1 configures a control unit that enables the data to be written to the SSD 53 as the first nonvolatile memory with the booted first kernel (root file system mounting unit 67).

The application mounting unit 69, which implements a function of application mounting, mounts to activate an application included in the firmware loaded into the RAM 51. After activation of the application, the system control unit 19 functions as an update determining unit 71.

The update determining unit 71, which implements a function of update determining, accepts an update request, changes the mode of the boot mode flag in the ROM 49 from the normal mode to the update mode, and reboots the electronic device 1. The USB flash drive 37 storing data for update is connected to the USB interface 9, which causes the update request to be performed.

On the other hand, when the second kernel boots, the system control unit 19 functions as an initial file system mounting unit of the SSD 53 (hereinafter referred to as "SSD initial file system mounting unit") 73, a file system mounting unit of the SSD 53 (hereinafter referred to as "SSD file system mounting unit") 75, and an update processing unit 77.

The SSD initial file system mounting unit 73, which implements a function of initial file system mounting for the SSD 53, mounts an initial file system of the SSD 53 with the initial file system data included in the update program loaded into the RAM 51 to enable access to the SSD 53.

The SSD file system mounting unit 75, which implements a function of file system mounting for the SSD 53, accesses to the SSD 53 to recognize a file system so as to mount the recognized file system of the SSD 53. The file system of the SSD 53 has a directory tree, and enables the data to be read from the SSD 53.

Therefore, the system control unit 19 of Embodiment 1 configures the control unit that enables the data to be written to the SSD 53 as the first nonvolatile memory with the booted second kernel (SSD file system mounting unit 75).

The update processing unit 77, which implements a function of update processing, writes data for updating firmware to the SSD 53 to which the data can be written. The data for updating of Embodiment 1 is identical to that of the firmware stored in the SSD 53, or is the data for updating the firmware.

The data for updating is stored in the USB flash drive 37 connected to the USB interface 9. Accordingly, the update processing unit 77 mounts the USB flash drive 37 connected to the USB interface 9 when acquiring the data for updating from the USB flash drive 37.

Activation Processing

Figure 3:
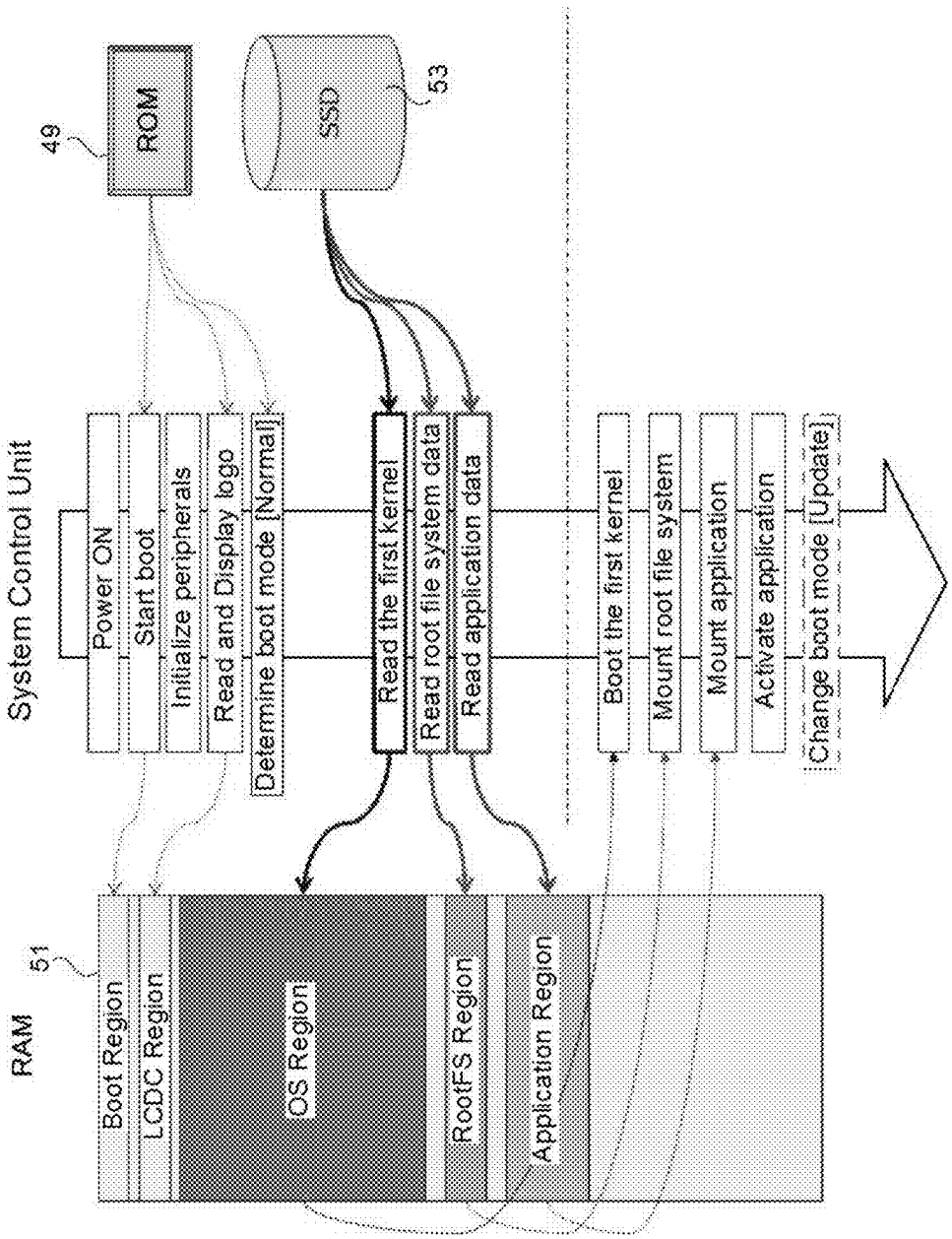
FIG. 3 illustrates a sequence of normal activation processing in the electronic device according to Embodiment 1.
Figure 4:
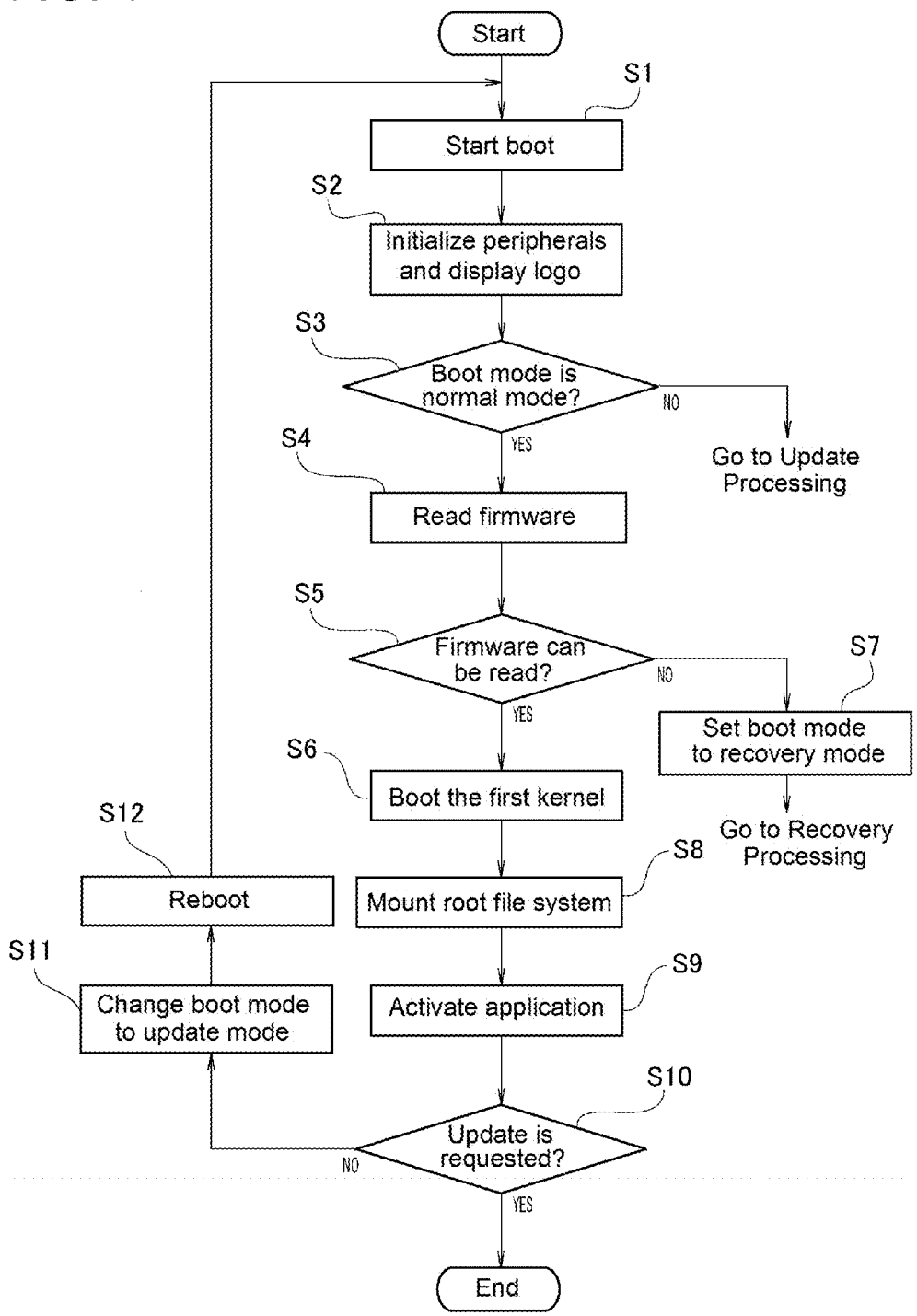
FIG. 4 illustrates steps of activation processing according to Embodiment 1.

FIG. 3 illustrates a sequence of normal activation processing in the electronic device 1 of FIG. 1, in conjunction with the ROM 49, the RAM 51, and the SSD 53. FIG. 4 illustrates steps of activation processing of FIG. 3.

A power source of the electronic device 1 is turned on, which causes the activation processing to start as illustrated in FIGS. 3 and 4. First, "Start boot" is performed in Step S1. That is, the system control unit 19 loads the boot program in the ROM 49 into a Boot region on the RAM 51 to start the boot.

After starting boot, "Initialize peripherals and Display logo" is performed in Step S2. That is, the boot processing unit 61 of the system control unit 19 initializes the peripherals. After initialization of the peripherals, the boot processing unit 61 reads the logo data from the ROM 49 to load the logo data into a liquid crystal display controller (LCDC) region on the RAM 51 so as to display the logo on the operation panel unit 13.

After displaying the logo, a determination on whether "Boot mode is normal mode?" is performed in Step S3. That is, the boot management unit 65 determines whether the boot mode is any of the normal mode and the update mode based on the boot mode flag in the ROM 49.

In the normal activation processing, the boot mode is the normal mode. This causes a process to proceed to Step S4. When the boot mode is the update mode, the process proceeds to the update processing of FIGS. 5 and 6.

The boot management unit 65 causes the boot processing unit 61 to continue the normal activation processing, which causes the process of "Read firmware" to be performed in Step S4. That is, the boot processing unit 61 reads the firmware from the SSD 53. For the read firmware, the boot processing unit 61 respectively loads: the first kernel into an OS region on the RAM 51, the root file system data into a RootFS region, and the application data into an application region.

Subsequently, the determination on whether "Firmware can be read?" is performed in Step S5. That is, the boot management unit 65 determines whether or not a read of the firmware in Step S4 can be performed. When the firmware can be read, the process proceeds to Step S6 and the normal activation processing continues. Meanwhile, when the firmware cannot be read, "Set boot mode to recovery mode" is performed in Step S7. Consequently, the boot mode flag in the ROM 49 is set to the recovery mode. Then, the process proceeds to the recovery processing of FIGS. 7 and 8.

"Boot the first kernel" is performed in Step S6. That is, the boot processing unit 61 boots the first kernel loaded into the RAM 51.

After booting the first kernel, "Mount root file system" is performed in Step S8. That is, the root file system mounting unit 67 of the system control unit 19 mounts the root file system with the root file system data loaded into the RAM 51 to enable the data to be read from and written to the HDD 55 and the SSD 53.

Subsequently, "Activate application" is performed in Step S9. That is, the application mounting unit 69 of the system control unit 19 mounts to activate the application with the application data loaded into the RAM 51.

After activation of the application, the determination on whether "Update is requested?" is performed in Step S10. That is, the update determining unit 71 of the system control unit 19 determines whether or not the update of the firmware is requested. In Embodiment 1, whether or not the USB flash drive 37 storing the data for updating is connected to the USB interface 9 is determined.

As a result of the determination, the activation processing is terminated when the USB flash drive 37 is not connected to the USB interface 9, or when these are connected and but the data for updating firmware is not stored in the USB flash drive 37.

Meanwhile, when the USB flash drive 37 storing the data for updating is connected to the USB interface 9, it is determined that the update of the firmware is requested.

In this case, "Change boot mode to update mode" is performed in Step S11. That is, the update determining unit 71 sets the mode of the boot mode flag in the ROM 49 to the update mode.

Figure 5:
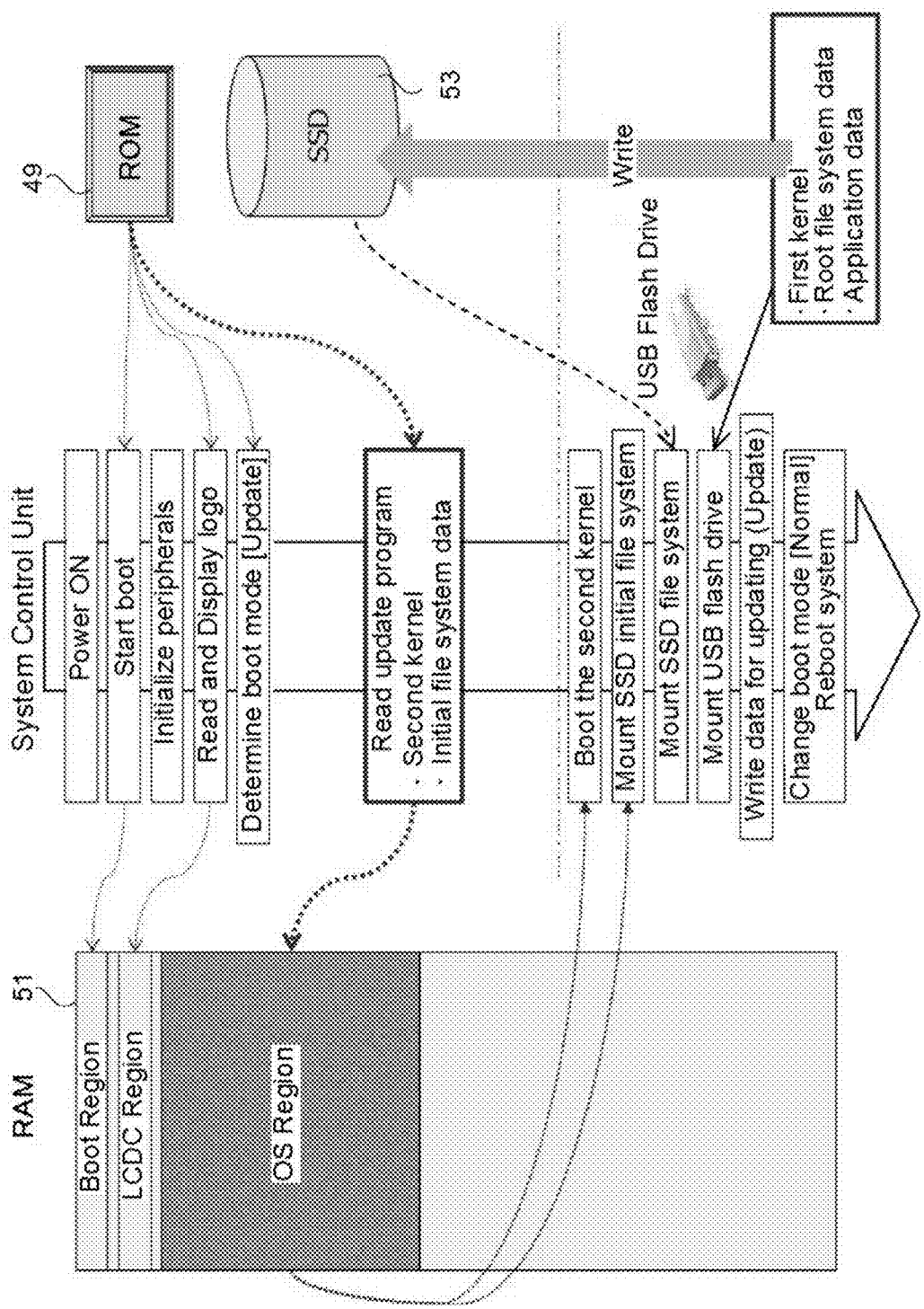
FIG. 5 illustrates a sequence of update processing of firmware in the electronic device according to Embodiment 1.
Figure 6:
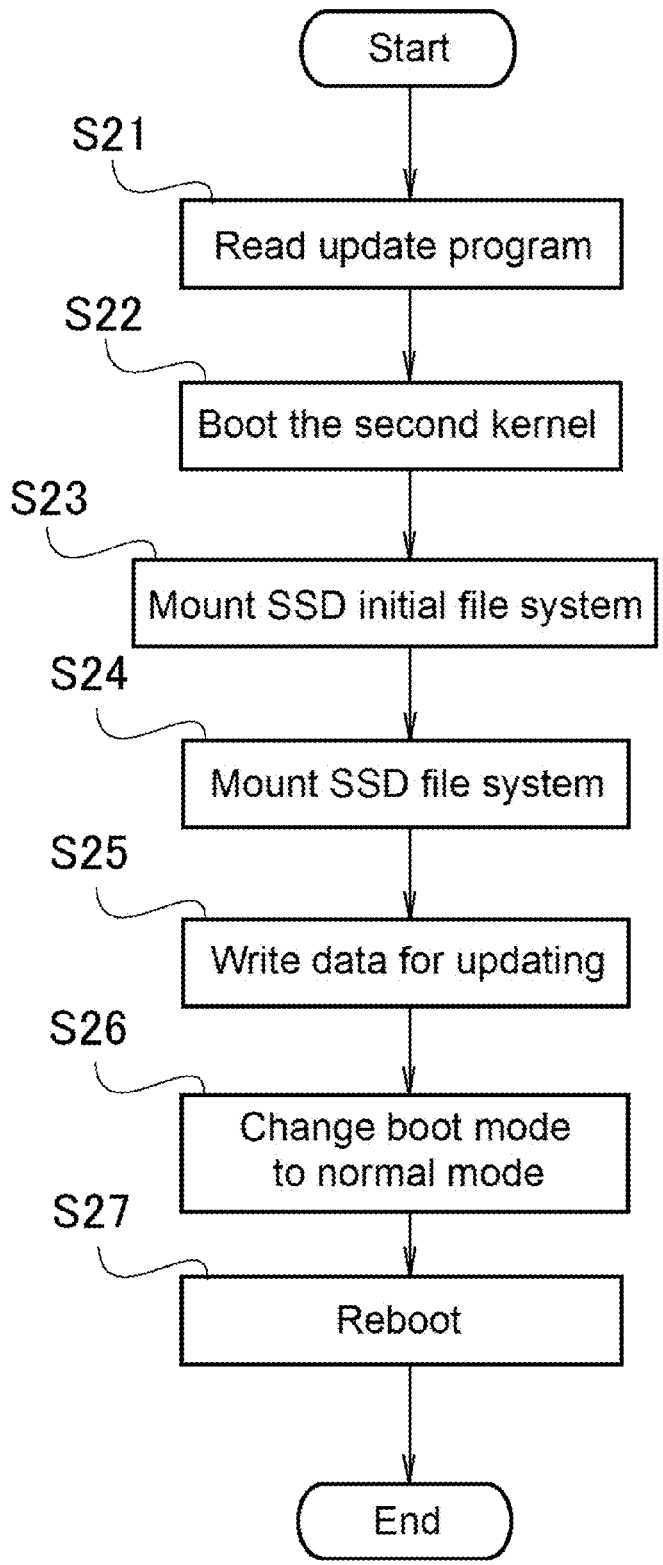
FIG. 6 illustrates steps of update processing according to Embodiment 1.

This change of the boot mode flag causes "Reboot" to be performed in Step S12, and accordingly causes the electronic device 1 to reboot. Consequently, the above-described activation processing (Step S1 and Step S2) resumes, and the process proceeds from Step S3 to the update processing.
Update Processing FIG. 5 illustrates a sequence of update processing of the firmware in the electronic device 1 of FIG. 1, in conjunction with the ROM 49, the RAM 51, and the SSD 53. FIG. 6 illustrates steps of update processing of FIG. 5.

The update processing, corresponding to a reboot of the electronic device 1, performs starting boot, Initializing peripherals and displaying logo of Step S1 and Step S2 of FIG. 4 similarly to the normal activation processing.

After displaying the logo, the boot management unit 65 of the system control unit 19 determines that the mode is the update mode based on the boot mode flag in the ROM 49 in Step S3 of FIG. 4. Accordingly, a flow chart of FIG. 6 is initiated.

That is, the update processing first performs "Read update program" in Step S21 of FIG. 6. More specifically, the boot management unit 65 causes the boot processing unit 61 to perform the update processing. The boot processing unit 61 reads the update program from the ROM 49. The boot processing unit 61 loads the read update program into the OS region on the RAM 51.

Subsequently, "Boot the second kernel" is performed in Step S22. That is, the boot processing unit 61 boots the second kernel of the update program loaded into the RAM 51.

After booting the second kernel, "Mount SSD initial file system" is performed in Step S23. That is, the SSD initial file system mounting unit 73 of the system control unit 19 mounts the initial file system of the SSD 53 with the initial file system data included in the update program loaded into the RAM 51. This accordingly enables access to the SSD 53.

Subsequently, "Mount SSD file system" is performed in Step S24. That is, the SSD file system mounting unit 75 of the system control unit 19 recognizes the file system of the SSD 53 to mount by access to the SSD 53. This accordingly enables the data to be written to the SSD 53.

"Write data for updating" is performed in Step S25 with respect to the SSD 53 to which the data can be written. That is, the update processing unit 77 of the system control unit 19 mounts the USB flash drive 37 connected to the USB interface 9 to read the data for updating from the mounted USB flash drive 37.

Then, the update processing unit 77 writes the read data for updating to the SSD 53 and updates the firmware to perform update processing. The USB flash drive 37 is connected to the USB interface 9 upon request of the update.

Thus, after completion of update of the firmware, "Change boot mode to normal mode" is performed in Step S26. That is, the boot mode setting unit 63 changes the mode of the boot mode flag in the ROM 49 to the normal mode.

Figure 7:
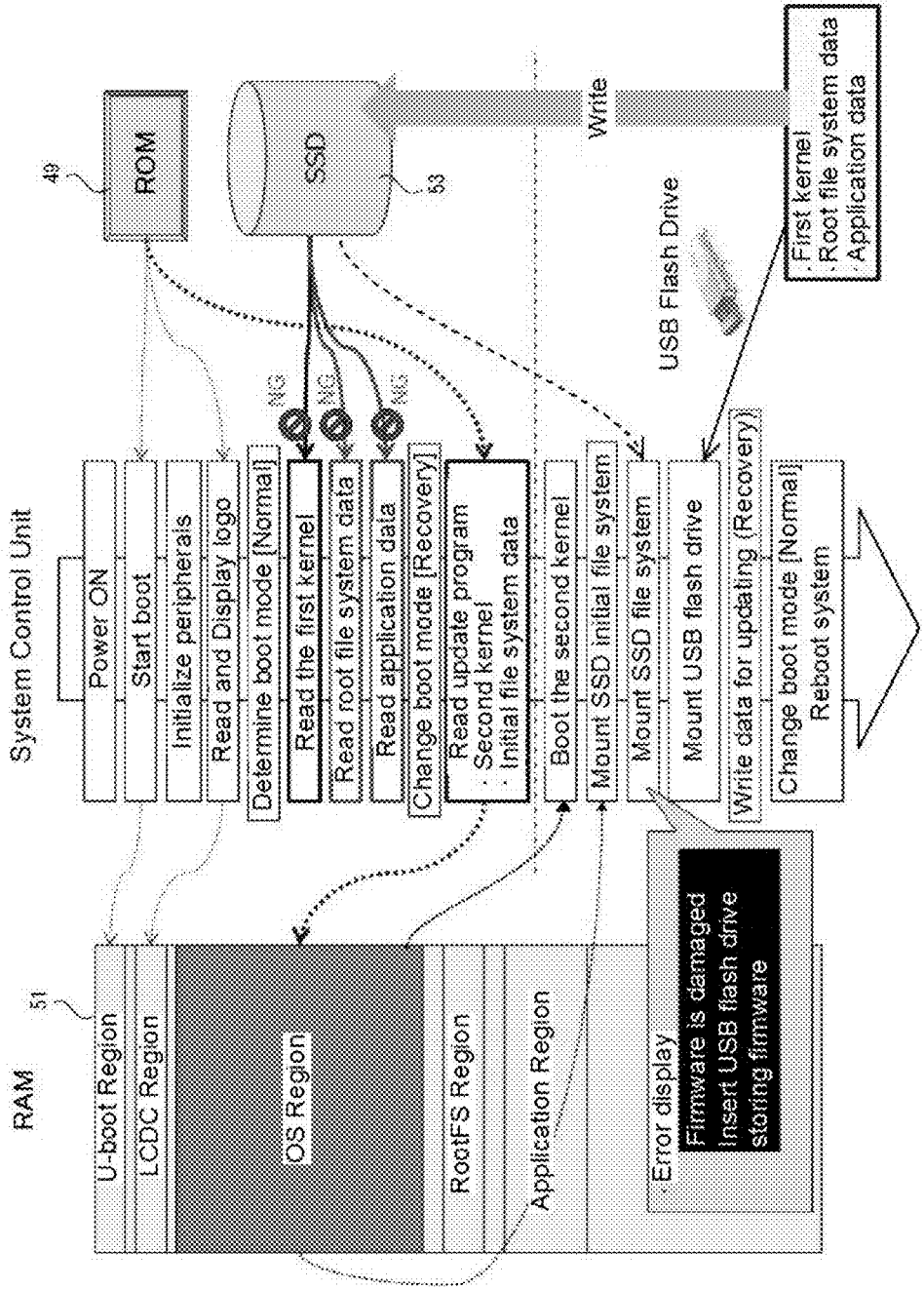
FIG. 7 illustrates a sequence of recovery processing of firmware in the electronic device according to Embodiment 1.
Figure 8:
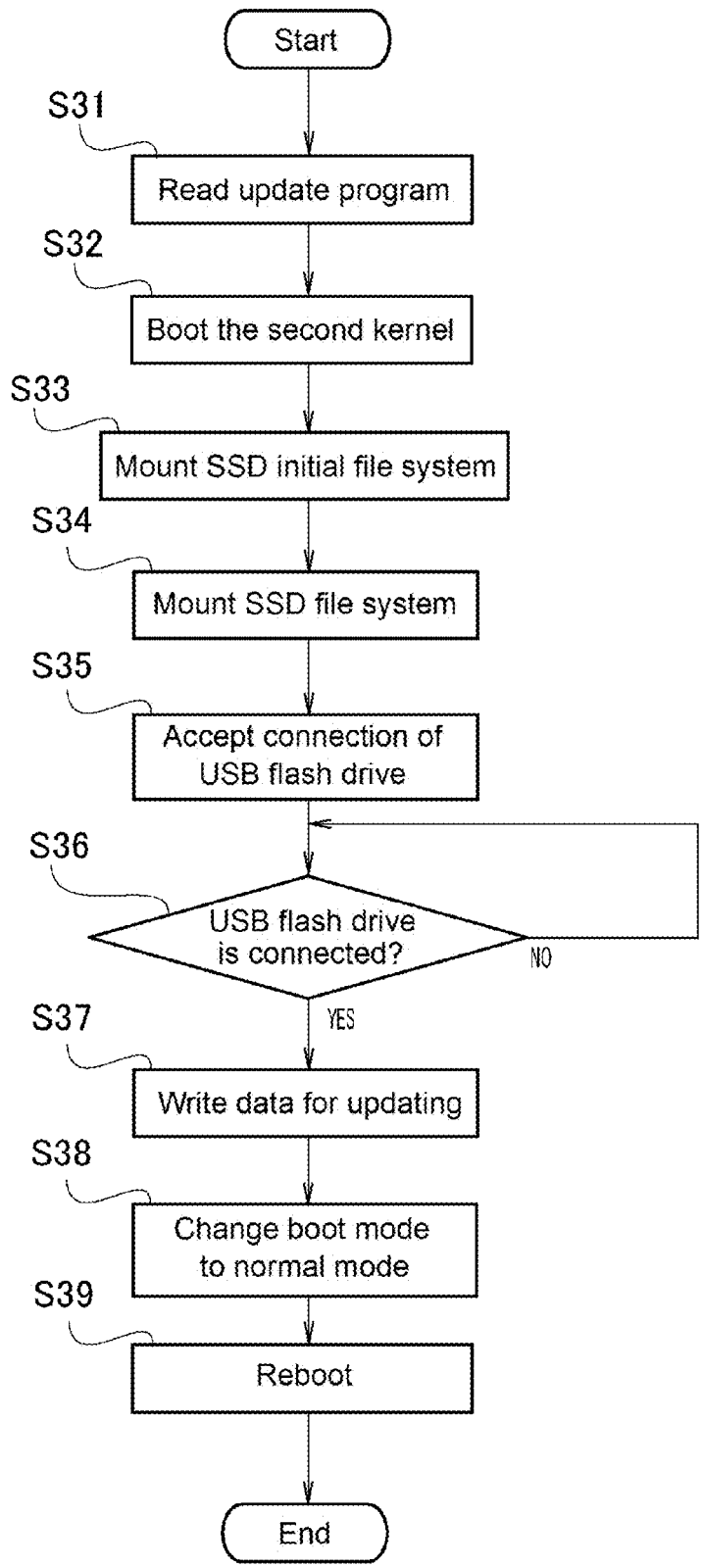
FIG. 8 illustrates steps of recovery processing according to Embodiment 1.

Thereafter, "Reboot" is performed in Step S27, which causes the electronic device 1 to reboot.
Recovery Processing FIG. 7 illustrates a sequence of recovery processing of the firmware in the electronic device 1 of FIG. 1, in conjunction with the ROM 49, the RAM 51, and the SSD 53. FIG. 8 illustrates steps of recovery processing of FIG. 7.

The recovery processing is performed when the firmware cannot read from the SSD 53 by the normal activation processing, where the firmware stored in the SSD 53 is damaged or where the firmware is not stored in the SSD 53.

Therefore, the power source of the electronic device 1 is turned on, which causes the recovery processing to start. The recovery processing performs starting boot similarly to the normal activation processing, initializing peripherals, displaying logo, and determining boot mode in a manner such as Steps S1 to S3 of FIG. 4. When the recovery processing is performed, the boot mode is the normal mode. The boot management unit 65 causes the boot processing unit 61 to continue the normal activation processing. Then, the process proceeds to Step S4 of FIG. 4.

In Step S4, the boot processing unit 61 starts reading of the firmware from the SSD 53 as the normal activation processing, which results in impossibility of reading the firmware from the SSD 53.

Therefore, it is determined that the firmware cannot be read in Step S5 of FIG. 4. Consequently, the boot mode flag is set to the recovery mode in Step S7 of FIG. 4. Accordingly, a flow chart of FIG. 8 is initiated.

The flow chart of the recovery processing of FIG. 8 is basically identical to the flow chart of the update processing of FIG. 6. That is, Steps S31 to S34 of FIG. 8 correspond to Steps S21 to S24 of FIG. 6, respectively. Steps S37 to S39 of FIG. 8 correspond to Steps S25 to S27 of FIG. 6, respectively.

Therefore, the recovery processing performs reading update program, booting the second kernel, mounting initial file system of the SSD 53, and mounting file system of the SSD 53 in Steps S31 to S34 of FIG. 8.

After mounting the file system of the SSD 53, "Accept connection of USB flash drive" is performed in Step S35. That is, the update processing unit 77 of the system control unit 19 displays on the operation panel unit 13 to prompt a serviceman or any other staff to connect the USB flash drive 37 storing the data for updating firmware. This consequently causes a connection of the USB flash drive 37 to be accepted.

Subsequently, the determination on whether "USB flash drive is connected?" is performed in Step S36. That is, the update processing unit 77 determines whether or not the USB flash drive 37 storing the data for updating is connected to the USB interface 9.

When the USB flash drive 37 is connected, the update processing unit 77, in Step S37, reads the data for updating from the USB flash drive 37 to write with respect to the SSD 53 to which the data can be written. Thus, the update of the firmware or the recovery with a new storage is performed.

Meanwhile, until the USB flash drive 37 is connected, the determination of Step S36 is performed repeatedly.

Thus, after completion of recovery of the firmware, the boot mode is set to the normal mode in Step S38, and the electronic device 1 is rebooted in Step S39.

The update processing, which does not include Steps S35 and S36 of the recovery processing, may be performed based on the flow chart of FIG. 8 referring an algorithm identical to that of the recovery processing. In this case, the processes of Steps S35 and S36 are performed in the update processing. However, the USB flash drive 37 is already connected to the USB interface 9, which causes Steps S35 and S36 to be omitted in fact.

Effects of Embodiment 1

As stated previously, the electronic device 1 of Embodiment 1 includes the SSD 53, the ROM 49, and the system control unit 19. The SSD 53 is capable of storing the firmware including the first kernel. The ROM 49 stores the update program including the second kernel. The system control unit 19 reads the firmware or the update program by the boot process to boot the first or the second kernel so as to enable the data to be written to the SSD 53 with the booted first or second kernel.

When the firmware cannot be read, the system control unit 19 reads the update program to perform the boot process, which boots the second kernel, and writes the data for updating firmware to the SSD 53 to which the data can be written with the booted second kernel.

Therefore, in Embodiment 1, even when the firmware cannot be read during activation of the electronic device 1, the second kernel included in the update program enables the electronic device 1 to be activated until the data can be written to the SSD 53, and the data for updating firmware to be written to the SSD 53. This accordingly enables recovery of the firmware that has not been able to be read during activation of the electronic device 1.

Thus, in Embodiment 1, the firmware of the SSD 53 can be recovered during activation. This ensures the reduced activation time by storing the firmware in the SSD 53.

In Embodiment 1, the update processing can be performed based on the algorithm identical to that of the recovery processing of the firmware. In this case, if only the function of update processing of the firmware necessary for the electronic device 1 is installed, the recovery processing function of the firmware also can be installed.

The electronic device 1 of Embodiment 1 includes the USB interface 9 for connecting to the USB flash drive 37 storing the data for updating. The system control unit 19 acquires the data for updating from the USB flash drive 37 connected to the USB interface 9 to write to the SSD 53.

This accordingly enables easy and secure recovery of the firmware with use of the USB flash drive 37, in Embodiment 1.

The update program includes the initial file system data of the SSD 53. The system control unit 19 mounts the initial file system of the SSD 53 with the initial file system data of the read update program by the booted second kernel, accesses to the SSD 53 with the initial file system to recognize the file system of the SSD 53, and mounts the recognized file system of the SSD 53, thus enabling the data to be written to the SSD 53.

This ensures that the data can be securely written to the SSD 53 with the booted second kernel, in Embodiment 1.

Embodiment 2

Figure 9:
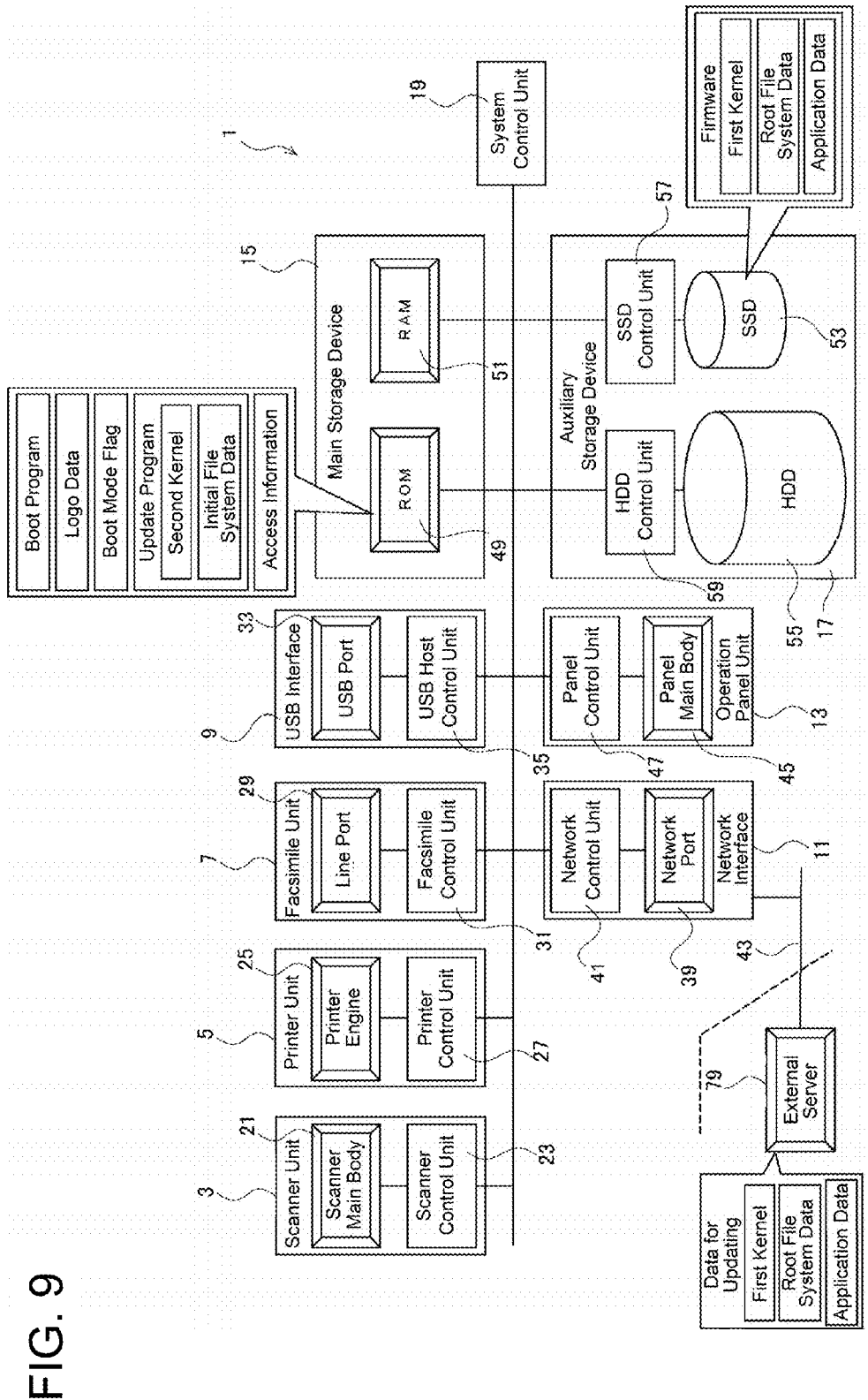
FIG. 9 illustrates a configuration of an electronic device according to Embodiment 2 of the disclosure.
Figure 10:
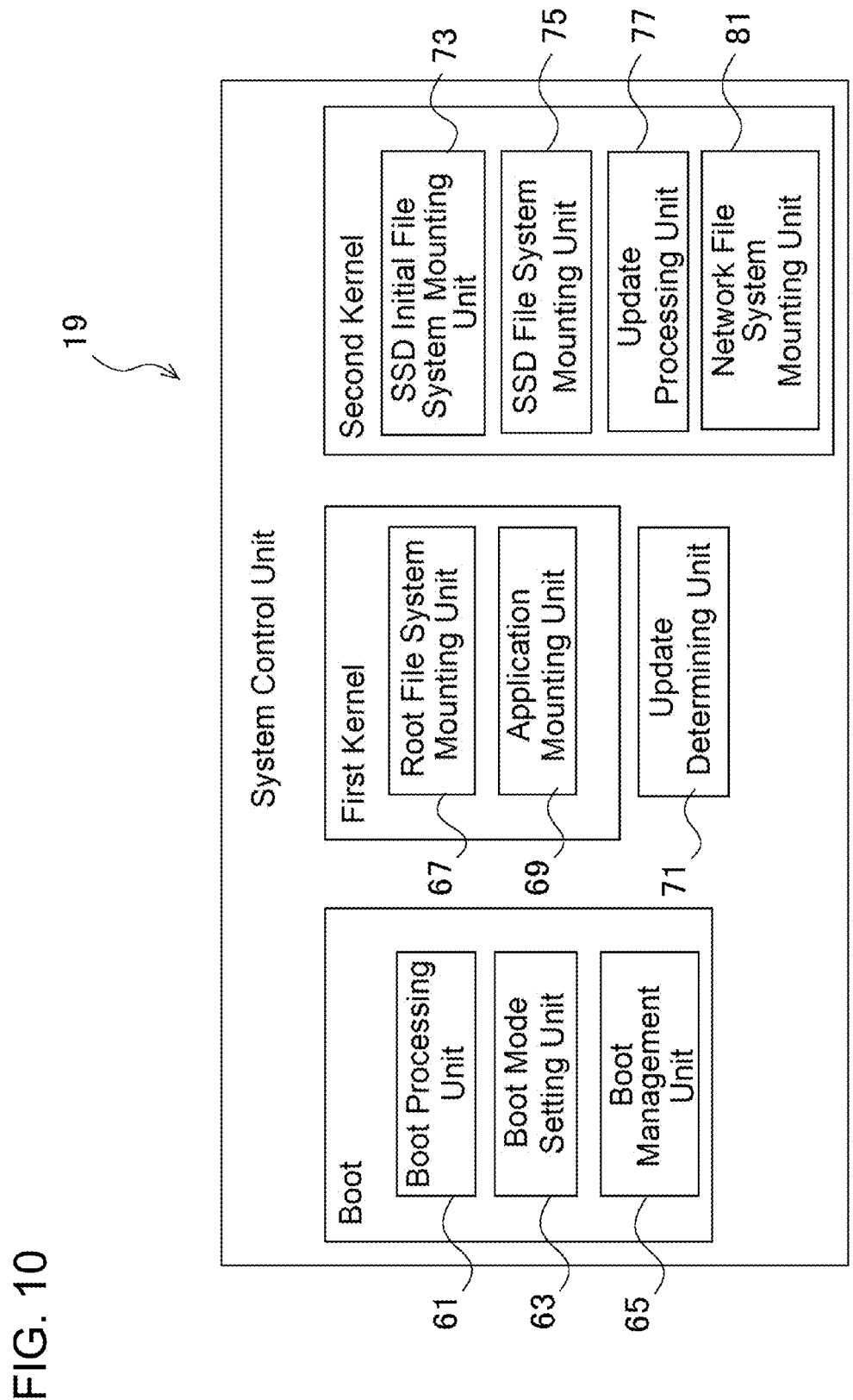
FIG. 10 illustrates a detail of a system control unit according to Embodiment 2.

FIG. 9 illustrates a schematic configuration of an electronic device according to Embodiment 2 of the disclosure. FIG. 10 illustrates a detail of a system control unit of FIG. 9 in a function block. Embodiment 2 has a basic configuration in common with Embodiment 1. Therefore, like reference numerals are given to corresponding configurations, and the repeated description will be further elaborated or simplified here. FIG. 9 and FIG. 10 correspond to FIGS. 1 and 2 of Embodiment 1, respectively. Accordingly, like reference numerals are given to the configurations of FIG. 9 and FIG. 10 respectively corresponding to FIGS. 1 and 2.

The electronic device 1 of Embodiment 2 reads the data for updating stored in an external server 79 to write to the SSD 53 in the recovery processing.

Therefore, the system control unit 19 functions as a network file system mounting unit 81 as well by booting the second kernel.

The network file system mounting unit 81, which implements a function of network file system mounting, acquires information of access to the external server 79 from the ROM 49 to network file system (NFS)-mount.

This accordingly enables the update processing unit 77 to read the data for updating from the external server 79 with a network 43.

Figure 11:
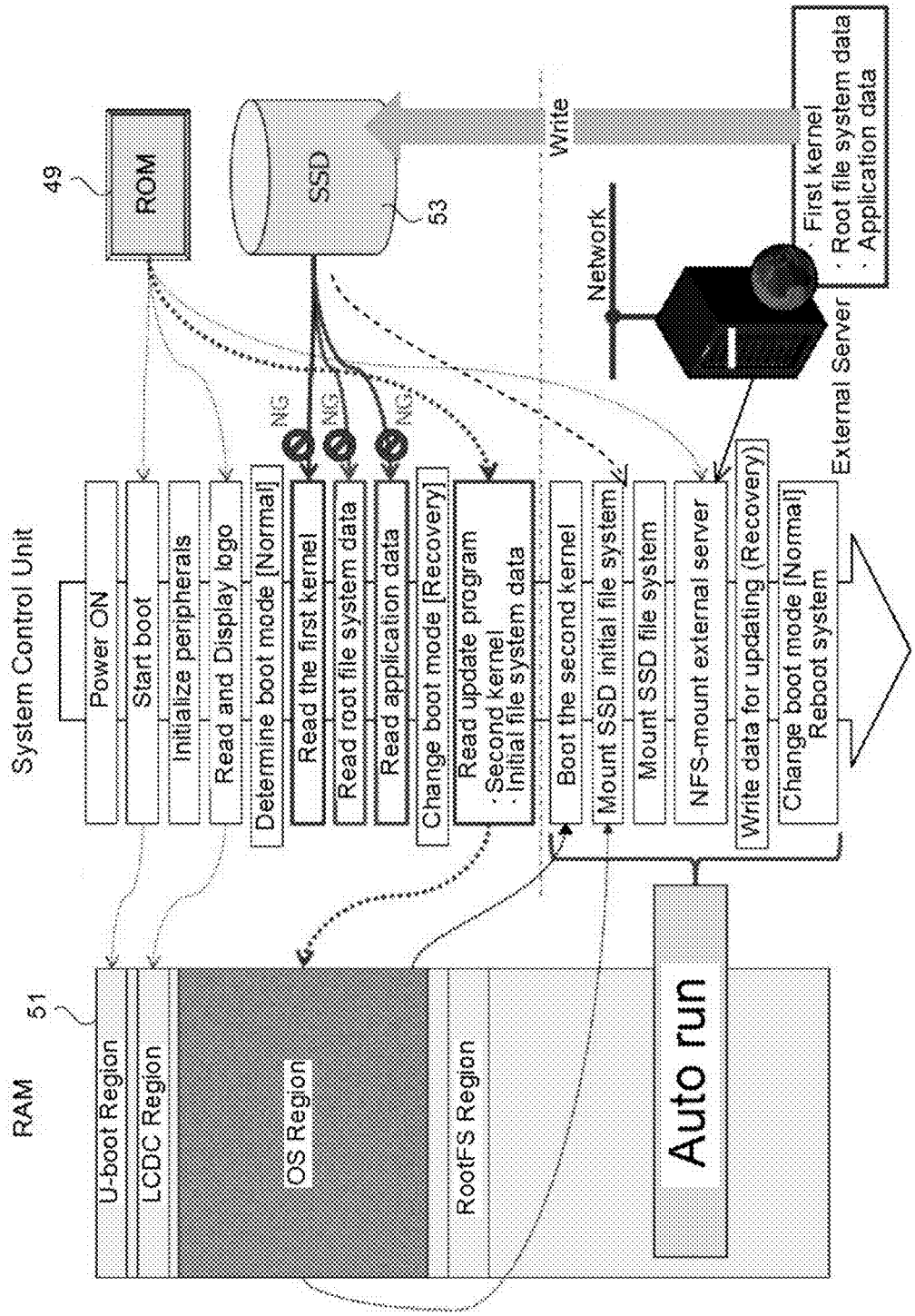
FIG. 11 illustrates a sequence of recovery processing of firmware in the electronic device according to Embodiment 2.
Figure 12:
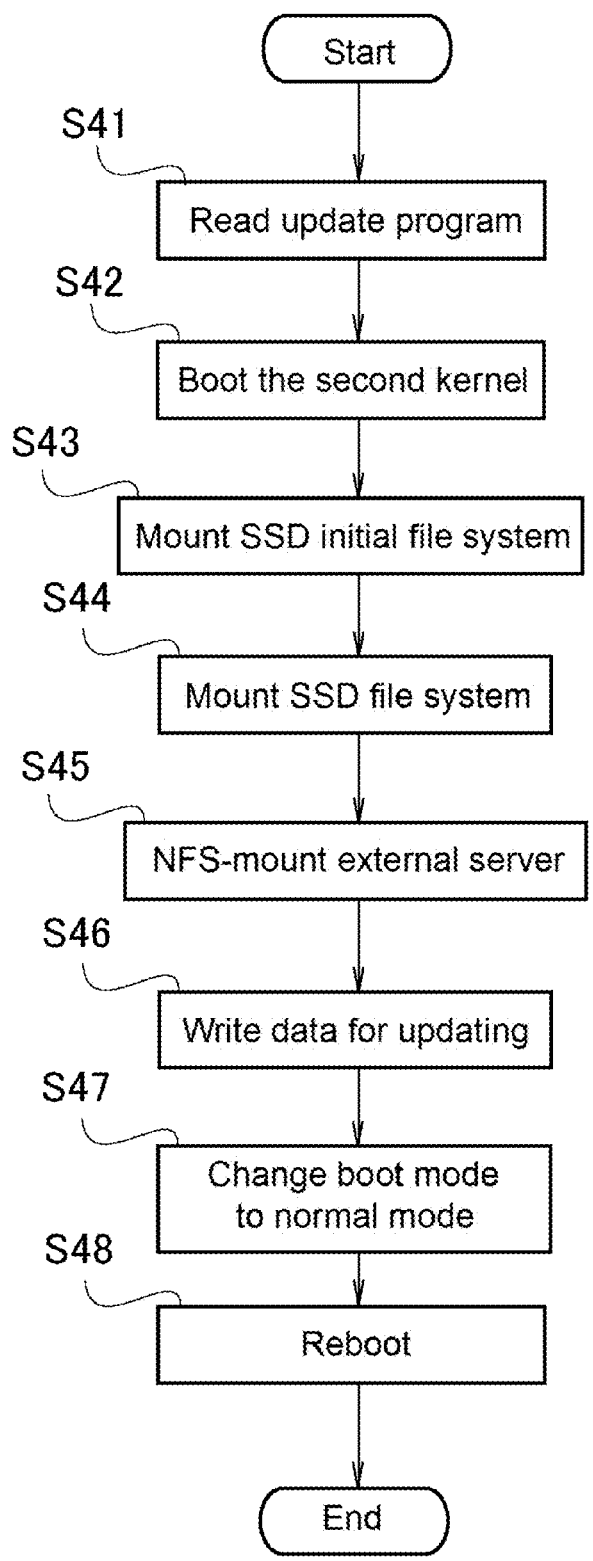
FIG. 12 illustrates steps of recovery processing according to Embodiment 2.

FIG. 11 illustrates a sequence of recovery processing of the firmware in the electronic device 1 of FIG. 9, in conjunction with the ROM 49, the RAM 51, the SSD 53, and the external server 79. FIG. 12 illustrates steps of recovery processing of FIG. 11.

The recovery processing of Embodiment 2 performs initializing peripherals, displaying logo, determining boot mode, starting read of firmware, setting boot mode of boot mode flag to recovery mode by Steps S1 to S5 and S7 of FIG. 4 similarly to that of Embodiment 1. Accordingly, a flow chart of FIG. 12 is initiated.

The flow chart of the recovery processing of FIG. 12 is basically identical to the flow chart of FIG. 8. Steps S41 to S44 of FIG. 12 correspond to Steps S31 to S34 of FIG. 8, respectively. Steps S46 to S48 of FIG. 12 correspond to Steps S37 to S39 of FIG. 8, respectively.

Therefore, the recovery processing performs, similarly to that of Embodiment 1, reading update program, booting the second kernel, mounting initial file system of the SSD 53, and mounting file system of the SSD 53 in Steps S41 to S44 of FIG. 12.

Subsequently, "NFS-mount external server" is performed in Step S45. That is, the network file system mounting unit 81 of the system control unit 19 acquires the information of access to the external server 79 from the ROM 49 to NFS-mount the external server 79, thus enabling the data for updating to be read from the external server 79.

Subsequently, "Write data for updating" is performed in Step S46. The update processing unit 77 downloads the data for updating from the external server 79 to write to the SSD 53.

Thus, as the update of the firmware or the recovery with the new storage is performed, "Set boot mode to normal mode" is performed in Step S47. Subsequently, the boot mode setting unit 63 sets the mode of the boot mode flag in the ROM 49 to the normal mode.

Thereafter, "Reboot" is performed in Step S48, which causes the electronic device 1 to reboot.

As described above, in Embodiment 2, it is possible to automatically download the data for updating from the external server 79 and then recovery the firmware in the SSD 53. This accordingly eliminates the need for the recovery operations performed by the serviceman or any other staff, thus ensuring the reduced maintenance costs.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An electronic device comprising:
    a volatile memory;
    a first nonvolatile memory that includes an area to store firmware, the firmware including a first kernel;
    a second nonvolatile memory that includes an area to store an update program, the update program including a second kernel and initial file system data of the first nonvolatile memory; and
    a control circuit that reads one of the firmware and the update program and loads the read one of the firmware and the update program into the volatile memory by boot process, boots the one of the first and the second kernels, and ensures writing data to the first nonvolatile memory by the booted one of the first and the second kernels; wherein
    when the firmware is incapable of being read, the control circuit (i) reads the update program and performs the boot process to boot the second kernel, (ii) mounts an initial file system of the first nonvolatile memory by the initial file system data of the read update program so as to ensure accessing to the first nonvolatile memory, the update program being read by the booted second kernel, (iii) accesses to the first nonvolatile memory by the initial file system so as to recognize a file system of the first nonvolatile memory, (iv) mounts the recognized file system of the first nonvolatile memory so as to ensure writing the data to the first nonvolatile memory, and (v) acquires updating data of the firmware from an external storage medium or an external server, and writes the updating data of the firmware to the first nonvolatile memory, the first nonvolatile memory being writable of the data by the booted second kernel.

2. The electronic device according to claim 1, further comprising:
    an external interface that performs a processing that connects the external storage medium, the external storage medium storing the updating data; wherein
    the control circuit acquires the updating data from the external storage medium and writes the updating data to the first nonvolatile memory, the external storage medium being connected to the external interface.

3. The electronic device according to claim 1, further comprising:
    a network interface that performs a processing that connects to the external server via a network, the external server storing the updating data; wherein
    the control circuit acquires the updating data from the external server and writes the updating data to the first nonvolatile memory, the external server being connected to the network interface.

4. The electronic device according to claim 1, wherein:
    the firmware further includes root file system data; and
    when the firmware is capable of being read by the boot process, the control circuit boots the first kernel, reads the root file system data and loads the read root file system data into the volatile memory, and mounts a root file system by the read root file system data so as to ensure the writing the data to the first nonvolatile memory, and
    when the firmware is incapable of being read by the boot process, the control circuit performs the boot process by rebooting when the firmware is written to the first nonvolatile memory.

5. A non-transitory computer-readable recording medium storing a firmware recovery program of an electronic device, the electronic device including a volatile memory, a first nonvolatile memory that includes an area to store firmware, the firmware including a first kernel, and a second nonvolatile memory that includes an area to store an update program, the update program including a second kernel and initial file system data of the first nonvolatile memory, wherein the firmware recovery program causes the electronic device to function as:
    the volatile memory;
    the first nonvolatile memory that includes the area configured to store the firmware, the firmware including the first kernel;
    the second nonvolatile memory that includes the area configured to store the update program, the update program including the second kernel and the initial file system data of the first nonvolatile memory; and
    a control circuit that reads one of the firmware and the update program and loads the read one of the firmware and the update program into the volatile memory by boot process, boots the one of the first and the second kernels, and ensures writing data to the first nonvolatile memory by the booted one of the first and the second kernels; wherein
    when the firmware is incapable of being read, the control circuit (i) reads the update program and performs the boot process to boot the second kernel, (ii) mounts an initial file system of the first nonvolatile memory by the initial file system data of the read update program so as to ensure accessing to the first nonvolatile memory, the update program being read by the booted second kernel, (iii) accesses to the first nonvolatile memory by the initial file system so as to recognize a file system of the first nonvolatile memory, (iv) mounts the recognized file system of the first nonvolatile memory so as to ensure writing the data to the first nonvolatile memory, and (v) acquires updating data of the firmware from an external storage medium or an external server, and writes the updating data of the firmware to the first nonvolatile memory, the first nonvolatile memory being writable of the data by the booted second kernel.

6. The non-transitory computer-readable recording medium according to claim 5, wherein:
the firmware further includes root file system data; and
when the firmware is capable of being read by the boot process, the control circuit boots the first kernel, reads the root file system data and loads the read root file system data into the volatile memory, and mounts a root file system by the read root file system data so as to ensure the writing the data to the first nonvolatile memory, and
when the firmware is incapable of being read by the boot process, the control circuit performs the boot process by rebooting when the firmware is written to the first nonvolatile memory.

* * * * *